(No Model.)

G. T. RIDLON.
FRUIT PICKER.

No. 431,709. Patented July 8, 1890.

Witnesses:
J. J. Isley
F. Carl Davis

Inventor.
Gideon T. Ridlon,
per atty,
Elgin C. Verrill.

UNITED STATES PATENT OFFICE.

GIDEON T. RIDLON, OF PORTER, MAINE, ASSIGNOR OF ONE-HALF TO EDWIN R. CHELLIS, OF SAME PLACE.

FRUIT-PICKER.

SPECIFICATION forming part of Letters Patent No. 431,709, dated July 8, 1890.

Application filed April 26, 1890. Serial No. 349,661. (No model.)

*To all whom it may concern:*

Be it known that I, GIDEON T. RIDLON, of Porter, in the county of Oxford and State of Maine, have invented certain new and useful Improvements in Fruit-Pickers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in fruit-pickers, and is designed to provide a picker with improved means of severing the fruit-stem from the tree, of adjusting the angle of inclination of the basket, and of operating the cover of the basket, and in other details of construction, which will be hereinafter more fully described and specifically claimed.

Figure 1:
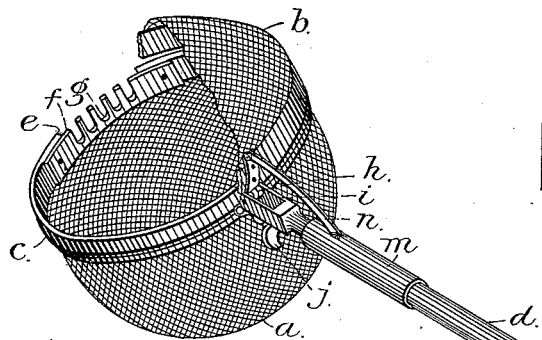
Figure 3:
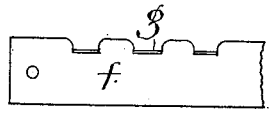
Figure 2:
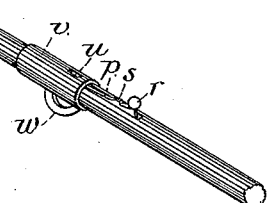
Figure 4:
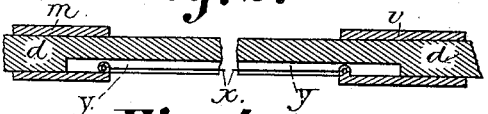

In the drawings herewith accompanying and making a part of this application, Figure 1 is an isometric view of my improved picker with a part of the cover removed. Fig. 2 is a longitudinal section of the same. Fig. 3 is a detail of the knife-plate. Fig. 4 is a detail of a part of the handle, in which is a recess for the cable that connects the ferrule and sleeve, and same letters refer to like parts.

In said drawings, $a$ represents the basket, $b$ the cover, and $d$ the handle. The basket has a rim around the top to which the netting may be attached in any convenient manner. Said rim has a part at the front cut away, and in the opening thus formed is placed a knife-blade $f$, having a series of depressions, the bottoms $g$ of which are beveled inwardly and downwardly, the corners being rounded, as shown in Fig. 3, so as not to present any sharp points which would be likely to injure the fruit. The basket may be attached to the end of the handle by a hinge-joint $h$, the end of said handle being bifurcated, as shown at $i$. An adjustable brace $j$ is attached to the under side of the handle by a thumb-screw $k$, which passes through a slot $l$ in the brace and thence into the handle. The free end of the brace curving downwardly rests against the rear portion of the basket and serves as a support therefor. When the brace is made of spring metal, it also serves to lessen the force of the concussion caused by the cover descending upon the basket to sever the stem of the fruit. The angle of inclination of the basket can be readily changed, loosening the thumb-screw $k$ and moving the brace back or forward, as the case may be. The rim $c$ has a bead $o$ on the outside thereof, located a little below the bottom of the depressions in the knife-blade, to serve as a stop for the cover. The cover $b$ is of somewhat greater diameter than the basket, and is also hinged in the bifurcated end of the handle in such manner that it will fall outside of the rim $c$ of the basket when driven forward. The handle has near the basket end thereof a sliding ferrule $m$, beneath which is a coil-spring $t$ constantly tending to force said ferrule forward toward the basket. A link $n$ connects the cover and ferrule, one end being pivoted to the cover and the other to the ferrule. Near the opposite end of the handle and recessed therein is a trigger $p$, having a thumb-piece $r$ and a locking-spur $s$, and between it and the bottom of said recess a spring $q$ constantly tending to force said trigger outward. Adapted to slide on said handle and over the said trigger is a sleeve $v$, having a slot $u$ therein, into which the spur $s$ will project when the sleeve is drawn back over the trigger, thus locking the sleeve in that position until the trigger is again depressed. Connecting ferrule $m$ and sleeve $v$ is a cable $x$. In order to prevent the danger of the cable being caught in the branches of the tree, it should be arranged to work in a recess $y$, made in the handle, as in Fig. 4.

From the description already given the operation of my improved picker will be evident. When the sleeve is drawn back, the cover is raised from the basket and allows a fruit to be received, the stem lodging in one of the depressions in the knife-blade. Then press down upon the thumb-piece of the trigger and release the sleeve and the coil-spring beneath the ferrule drives the cover forward and downward upon the stem, forcing it upon the knife, and thus severing the fruit which falls into the basket. The sleeve is again drawn back ready for another fruit, or to enable that already in the basket to be removed.

Besides the advantages already described it will be evident that the arrangement of the knives and the form of the intermediate metal prevents any injury to the fruit, and also that there is nothing at the forward end of the basket or at the sides thereof to become entangled in the branches or thorns of the tree.

Having thus described my invention and its use, what I claim, and desire to secure by Letters Patent of the United States, is—

1. The combination, with a suitable handle and a basket hinged thereto, of an adjustable brace attached to said handle by means of a thumb-screw passing through a slot in said brace, the opposite end of said brace being bent downward to serve as a support for the basket, substantially as set forth.

2. The combination, with a handle and basket hinged to the end thereof, of a spring-brace attached to the under side of the handle and curved downward to form a support for the basket, substantially as set forth.

3. In a fruit-picker, the combination, with a handle and a cover hinged thereto, and means, substantially as described, for operating said cover, of a basket having a portion of its rim recessed, and in said recess a knife-blade having depressions therein and the bottom of said depressions beveled and sharpened, substantially as and for the purposes set forth.

4. In a fruit-picker, the combination, with a handle having a basket attached to the end thereof and a cover adapted to shut down upon said basket, said basket having recessed knives in the rim, of a ferrule adapted to slide on the handle and a coil-spring constantly tending to force said ferrule forward, a link having one end pivotally attached to the cover and the other to the ferrule, a spring-actuated pivoted trigger recessed into the handle, a sleeve adapted to slide upon the handle and lock said trigger, and a cable connecting the ferrule and sleeve, substantially as and for the purposes set forth.

5. In a fruit-picker, the combination, with a basket attached to the end of a long handle and a spring-actuated cover adapted to shut down upon said basket outside of the rim, of a series of depressions made in the rim of the basket opposite the handle, the bottoms of said depressions being sharpened and the upper part of the intermediate metal being dull and curved, substantially as and for the purposes set forth.

In testimony that I claim the foregoing as my own I affix my signature, in presence of two witnesses, this 18th day of April, A. D. 1890.

GIDEON T. RIDLON.

Witnesses:
LEVI O. VERRILL,
ELGIN C. VERRILL.